United States Patent
Van Seggelen et al.

(10) Patent No.: US 10,900,791 B2
(45) Date of Patent: Jan. 26, 2021

(54) COMMUNICATIONS APPARATUS, SYSTEM AND METHOD OF PROVIDING A USER INTERFACE

(75) Inventors: Rob Van Seggelen, Budel (NL); Breght Boschker, Utrecht (NL)

(73) Assignee: TomTom International B.V., Amsterdam (NL)

( * ) Notice: Subject to any disclaimer, the term of this patent is extended or adjusted under 35 U.S.C. 154(b) by 947 days.

(21) Appl. No.: 12/733,297

(22) PCT Filed: Jul. 31, 2008

(86) PCT No.: PCT/EP2008/006506
§ 371 (c)(1),
(2), (4) Date: Mar. 12, 2010

(87) PCT Pub. No.: WO2009/033533
PCT Pub. Date: Mar. 19, 2009

(65) Prior Publication Data
US 2010/0251134 A1 Sep. 30, 2010

Related U.S. Application Data

(60) Provisional application No. 60/960,078, filed on Sep. 14, 2007.

(51) Int. Cl.
*G06F 9/451* (2018.01)
*G01C 21/26* (2006.01)
*G01C 21/36* (2006.01)

(52) U.S. Cl.
CPC ............. *G01C 21/26* (2013.01); *G06F 9/451* (2018.02); *G01C 21/36* (2013.01)

(58) Field of Classification Search
CPC . G01C 21/36; G01C 21/3492; H04M 1/6083; G08G 1/0968; G06F 3/048; G06F 9/4443
(Continued)

(56) References Cited

U.S. PATENT DOCUMENTS

| 6,993,615 B2 | 1/2006 | Falcon |
| 2003/0107591 A1 | 6/2003 | Jameson |

(Continued)

FOREIGN PATENT DOCUMENTS

| EP | 1602897 | 12/2005 |
| GB | 2412254 | 3/2005 |

(Continued)

OTHER PUBLICATIONS

Yasushi Uchida, Widgets changing the future of household applicances, Nikkei Electronics, Japan, Nikkei Business Publications, Inc., Jul. 2, 2007, vol. 955, pp. 93-101.

*Primary Examiner* — Rinna Yi

(57) ABSTRACT

A communications apparatus includes a processing resource arranged to support, when in use, a main application and a user interface. The apparatus, in at least one embodiment, also includes a data store and a user interface host entity arranged to access, when in use, a user interface template selectable in response to a received message. The user interface template includes an expression of a number of user interface elements. The user interface is arranged to translate the user interface template selected from the expression of the number of user interface elements into a user interface instantiation.

18 Claims, 8 Drawing Sheets

(58) Field of Classification Search
USPC .......................................................... 715/744
See application file for complete search history.

(56) References Cited

U.S. PATENT DOCUMENTS

| | | |
|---|---|---|
| 2004/0098571 A1 | 5/2004 | Falcon |
| 2004/0098751 A1 | 5/2004 | Konda et al. |
| 2005/0055154 A1* | 3/2005 | Tanaka et al. ................. 701/200 |
| 2005/0231529 A1* | 10/2005 | Skwarek et al. .............. 345/619 |
| 2006/0031617 A1 | 2/2006 | Falcon |
| 2006/0106965 A1* | 5/2006 | Falcon ......................... 710/303 |
| 2007/0016362 A1 | 1/2007 | Nelson |
| 2007/0150190 A1 | 6/2007 | Riddiford |
| 2008/0068399 A1* | 3/2008 | Goss et al. .................... 345/629 |
| 2008/0226101 A1* | 9/2008 | Silber et al. ................... 381/123 |

FOREIGN PATENT DOCUMENTS

| | | |
|---|---|---|
| JP | 3139453 A | 6/1991 |
| JP | 10301946 A | 11/1998 |
| JP | 2007203750 A | 8/2007 |
| WO | WO 03/093765 | 11/2003 |

\* cited by examiner

COMMUNICATIONS APPARATUS, SYSTEM AND METHOD OF PROVIDING A USER INTERFACE

This application is the national phase under 35 U.S.C. §371 of PCT International Application No. PCT/EP2008/006506 which has an International filing date of Jul. 31, 2008, which designates the United States of America, and which claims priority on U.S. Provisional application No. 60/960,078 filed Sep. 14, 2007, the entire contents of each of which are hereby incorporated herein by reference.

FIELD OF THE INVENTION

The present invention relates to a communications apparatus of the type that, for example, has a user interface used that can be shared by a number of applications. The present invention also relates to a communications system of the type that, for example, has a first device comprising a user interface that can be shared by a number of applications. The present invention relates to a method providing a user interface, the method being of the type that, for example, provides a user interface that can be shared by a number of applications.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within the memory. The processor and memory cooperate to provide an execution environment in which a software operating system may be established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like, or automotive networks such as a Controller Area Network (CAN) or a Media-Oriented Systems Transport (MOST) network.

Navigation devices of this type also include a GPS antenna by means of which satellite-broadcast signals, including location data, can be received and subsequently processed to determine a current location of the device.

The navigation device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such navigation devices is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 920 GO model manufactured and supplied by TomTom International B.V., provide a reliable means for enabling users to navigate from one position to another. Such devices are of great utility when the user is not familiar with the route to the destination to which they are navigating.

Whilst, as suggested above, PNDs are primarily used for navigation-related functions and/or map display, it is known to couple the PND to other neighbouring electronic devices in order to improve user experience in relation to the PND and/or facilitate control of a neighbouring device, thereby reducing user workload and/or distraction, particularly when the PND and neighbouring device are located within a vehicle.

For some applications, interaction between the PND and an external device is supported by function interface definitions that define details of functionality provided by the external device. The interface definitions can, and typically do, relate to software processes within the device. However, in order to support an Application Programming Interface (API) structured in accordance with the interface definitions and relating to the external device, specific knowledge of the functionality of the external device is required for incorporation into a main application of the PND. Maintenance of the main application of the PND is therefore required when a new version of the API is released, for example when the external device is upgraded or a new model is released.

Consequently, the burden of ensuring up-to-date support of various interfaces relating to use of third-party devices is placed upon the manufacturer of the PND. Logistic difficulties can also arise when involvement of third parties associated with an external device is required in order to upgrade the main application of the PND. Furthermore, releases of versions of the main application of the PND become tied or dependent upon the readiness for incorporation into the main application of changes provided by third parties as a result of changes made to the external device that can be used in conjunction with the PND.

It is therefore desirable to avoid this dependency of release cycles of software and devices on release cycles of third party equipment.

SUMMARY OF THE INVENTION

According to a first aspect of the present invention, there is provided a communications apparatus comprising: a processing resource arranged to support, when in use, a main application and a user interface; a data store; and a user interface host entity arranged to access, when in use, a user interface template selectable in response to a received message, the user interface template comprising a predetermined expression of a number of user interface elements; wherein the user interface is arranged to translate the user interface template selected from the predetermined expression of the number of user interface elements into a user interface instantiation.

The processing resource may be arranged to arbitrate between competing requests to use the user interface.

The apparatus may further comprise: a communications interface capable of supporting communication with an external application relative to the main application via a communications network; wherein the processing resource is arranged to provide, when in use, the external application with remote access to the user interface via the communications network.

The message may be received via the communications interface. The message may be received via the communications interface, for example from the external application.

The number of user interface elements may be a number of user interface objects.

The user interface instantiation may be rendering of the number of user interface elements.

The communications interface may be arranged to communicate, when in use, with the external application; the external application may be located in a device external to the processing resource.

The apparatus may further comprise an electronic apparatus comprising the device; the electronic apparatus may be housed separately from the processing resource.

The user interface element may be a Graphical User Interface (GUI) widget. The user interface host may be arranged to receive data to customise the user interface instantiation, for example text to be displayed.

The main application may be associated with a first operational task and the external application may be associated with a second operational task. The first and second operational tasks may be different.

The first operational task may be a first vehicular task, for example a telematics task, and the second operational task may be a second vehicular task, for example, in-vehicle entertainment, air conditioning, climate control or sensor measurements, such as temperature measurement.

The user interface may be arranged to access the user interface template from a number of user interface templates stored locally. The message received via the communications interface may identify the user interface template and may constitute a selection of the user interface template.

The user interface may be arranged to receive, when in use, information qualifying a user interface element of the user interface template.

The number of user interface elements may comprise a definable control element.

The number of user interface elements may comprise a definable label element.

The user interface may be arranged to generate event data in response to a user interaction with the user interface instantiation of an element of the number of user interface elements.

The processing resource may be arranged to communicate the event data via the communications interface for receipt by the external application.

The apparatus may further comprise an input device arranged to receive a user interface navigation gesture; the event data may correspond to the user interface navigation gesture.

The user interface may be a graphical user interface. The user interface template may have a predetermined layout associated therewith.

The communications interface may be a wireless communications interface.

The input device may be a touchscreen, for example providing a soft key, a remote control and/or a voice activation module or another input device. The input device may be coupled to a steering mechanism of a vehicle, for example a steering column or a steering wheel.

According to a second aspect of the present invention, there is provided a navigation apparatus comprising the communications apparatus as set forth above in relation to the first aspect of the invention.

The navigation apparatus may be a portable navigation device.

According to a third aspect of the present invention, there is provided a communications system comprising: a first device comprising the communications apparatus; and a second device supporting the external application; wherein the first and second devices are arranged to communicate via the communications network.

The first device may have a first operational task associated therewith and the second device may have a second operational task associated therewith; the first and second operational tasks may be different.

The first device may be a navigation device and the second device may be an entertainment system.

The second device may be an air conditioning or climate control controller or a circuit board providing another function, for example ambient temperature monitoring.

According to a fourth aspect of the present invention, there is provided a method of providing a user interface, the method comprising: supporting a main application and a user interface therefor; receiving a message; selecting a user interface template in response to the message received, the user interface template comprising a predetermined expression of a number of user interface elements; and translating the selected user interface template from the predetermined expression of the number of user interface elements into a user interface instantiation for a user.

The method may further comprise: supporting a communications interface; supporting communication in a communications network; providing an external application relative to the main application with remote access to the user interface via the communications network.

According to a fifth aspect of the present invention, there is provided a computer program element comprising computer program code means to make a computer execute the method as set forth above in relation to the fourth aspect of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide an apparatus, system and method capable of decoupling a development cycle of the main application from a development cycle of the external application. Consequently, development of the main application is no longer dependent upon completion of the development cycle of the external application and the user interface provided is re-usable for different applications. Furthermore, the templates provided can be upgraded and/or supplemented easily on a subsequent occasion, even during runtime due to the templates being formed from data files. Additionally, a device comprising the main application can be developed so as to possess a reduced amount of code, thereby simplifying the device and reducing manufacturing cost and development time. The apparatus, system and method also permit the device comprising the main application to be interoperable with an increased number of external devices, thereby increasing the flexibility of the device and appeal to users. The user interface provided is uniform and, as suggested above, does not require individual development efforts for multiple devices. The user interface elements, for example, the widgets, are extendable as are characteristics of each widget, for example properties, events and/or layouts, the extendibility being possible without the need to change a communications protocol used in the implementation of the apparatus, method and/or system. Indeed, the above apparatus, method and system can be implemented with minimal protocol overhead and so latency in communication between entities is minimised. Additionally, it is possible to reduce errors and debugging required during development of the device comprising the main application by the provision of a simple and well-defined template.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
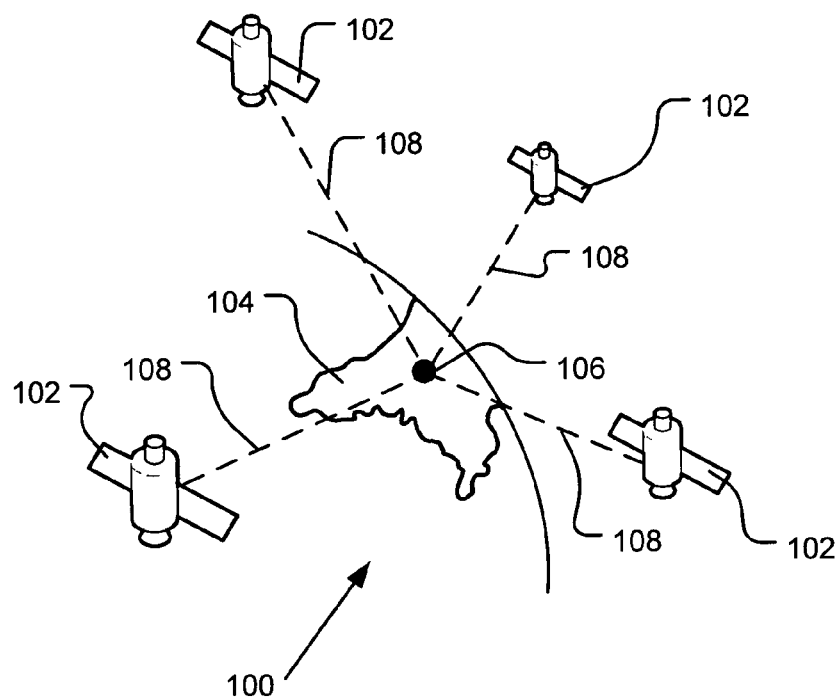
FIG. 1 is a schematic illustration of an exemplary part of a Global Positioning System (GPS) usable by a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device, for example any type of processing device that is configured to execute navigation software in a portable and/or mobile manner so as to provide route planning and navigation functionality. It therefore follows that reference herein to, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It will also be apparent from the following that the teachings herein even have utility in circumstances, where a user is not seeking instructions on how to navigate from one point to another, but merely wishes to be provided with a view of a given location. In such circumstances, the "destination" location selected by the user need not have a corresponding start location from which the user wishes to start navigating, and as a consequence any references herein to the "destination" location or indeed to a "destination" view should not be interpreted to mean that the generation of a route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
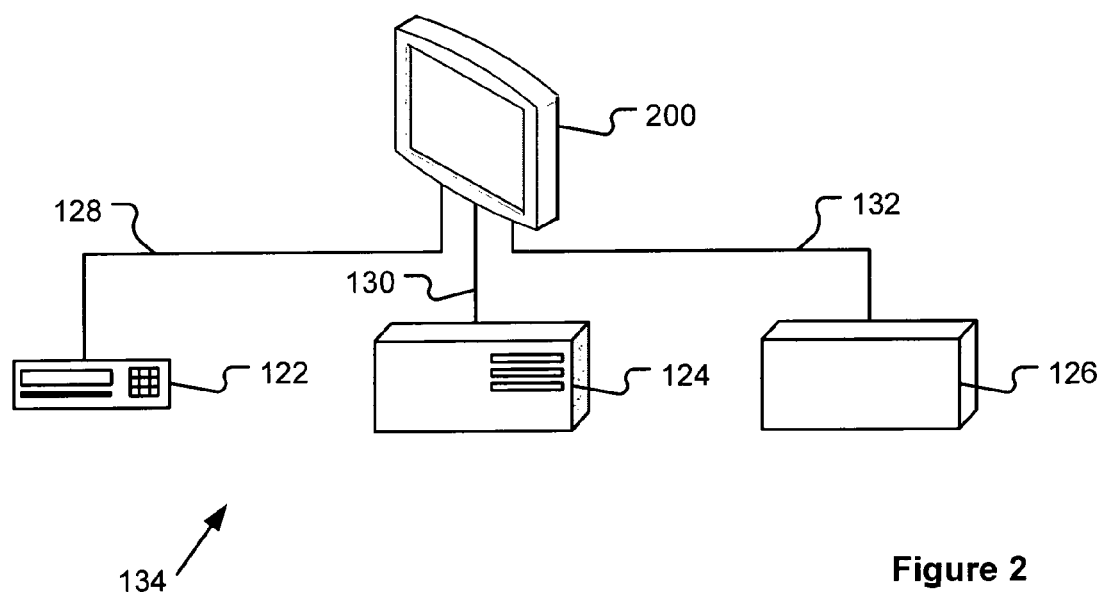
FIG. 2 is a schematic diagram of a communications system constituting an embodiment of the invention.

Turning to FIG. 2, a navigation device 200 is capable of communicating with a first external device 122, a second external device 124 and a third external device 126. In this example, the first external device 122 is an in-vehicle entertainment system, for example an FM radio, the second external device 124 is a control unit of a climate control system, for example an air conditioning system, and the third external device 126 is a circuit board of a hardware element of the vehicle, for example an external ambient temperature calculation unit. The first external device 122 is operably coupled to the navigation device 200 via a first wireless communications link 128, the second and third external devices 124, 126 being operably coupled to the navigation device 200 via respective second and third communications links 130, 132. The communications links 128, 130, 132 are respective Bluetooth links. However, other communications technologies can be employed including respective wired connections between the navigation device 200 and the first, second and third external devices 122, 124, 126.

The establishing of the communications links between the navigation device 200 and the external devices 122, 124, 126, can be done in accordance with any suitable communications technique. In this respect, any number of appropriate data communications protocols can be employed, for example the TCP/IP layered protocol. Furthermore, the mobile device can utilize other communications standards, for example any one of the IEEE 802.11a/b/c/g/n standards. Indeed, the communications links 128, 130, 132 are not limited to a particular communication technology. If desired, both digital and analogue signals can be transmitted through the communications links 128, 130, 132. These signals may be modulated, encrypted and/or compressed signals as may be desirable for the communication technology. Furthermore, the navigation device 200 coupled to the first, second and third external devices 122, 124, 126 constitute a communications system 134.

Figure 3:
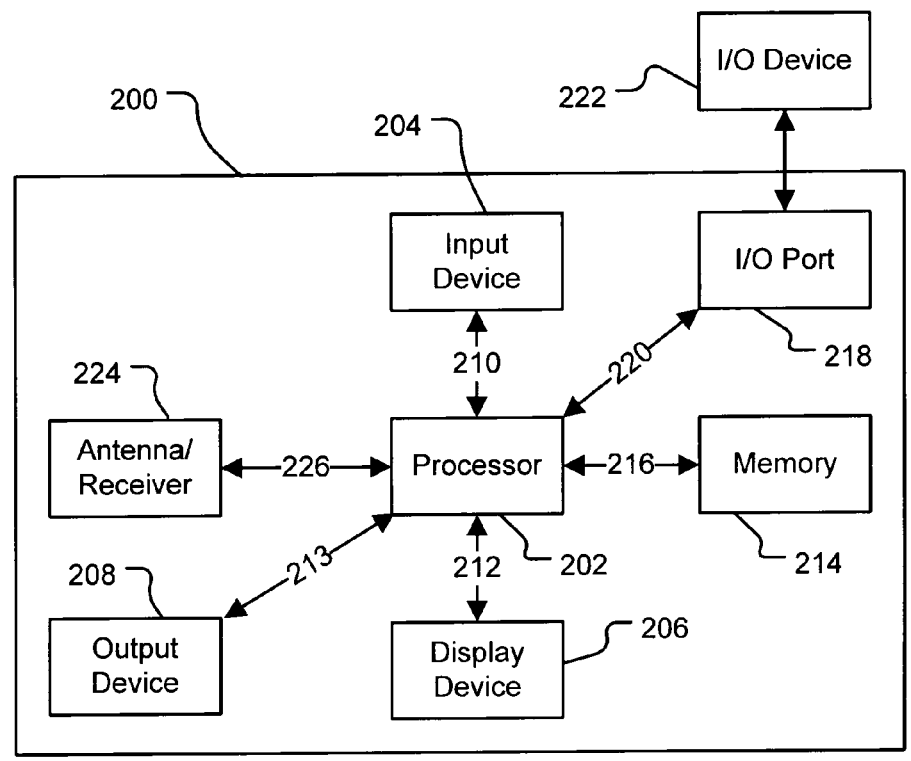
FIG. 3 is a schematic illustration of components of the navigation device of FIG. 3.

Referring to FIG. 3, it should be noted that the following description of the navigation device 200 in relation to FIG. 3 is not inclusive of all components of the navigation device 200, and is only representative of many example components. The navigation device 200 is located within a housing (not shown). The navigation device 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touch-screen, details of which will be described later herein In the navigation device 200, the processor 202 is operatively connected to and capable of receiving input information from input device 204 via a connection 210, and operatively connected to at least one of the display screen 206 and an output device 208, for example an audible output device, such as a loudspeaker, via respective output connections 212, 213, to output information thereto. As the output device 208 can produce audible information for a user of the navigation device 200, it is should equally be understood that input device 204 can include a microphone and software for receiving input voice commands as well. Further, the navigation device 200 can also include any additional input device and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. In this example, the connection to the I/O device 222 is a wireless connection to any of the external devices 122, 124, 126, although the I/O device 222 can be a wired or wireless connection to other external devices, such as for voice activated operation, for connection to an earpiece or headphones, and/or for connection to a mobile telephone, wherein the mobile telephone connection can be used to establish a data connection between the navigation device 200 and the Internet or any other network for example, and/or to establish a connection to a server via the Internet or some other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, an automobile or a boat for example. Such a navigation device 200 is then removable from the docked location for portable or handheld navigation use.

Figure 4:
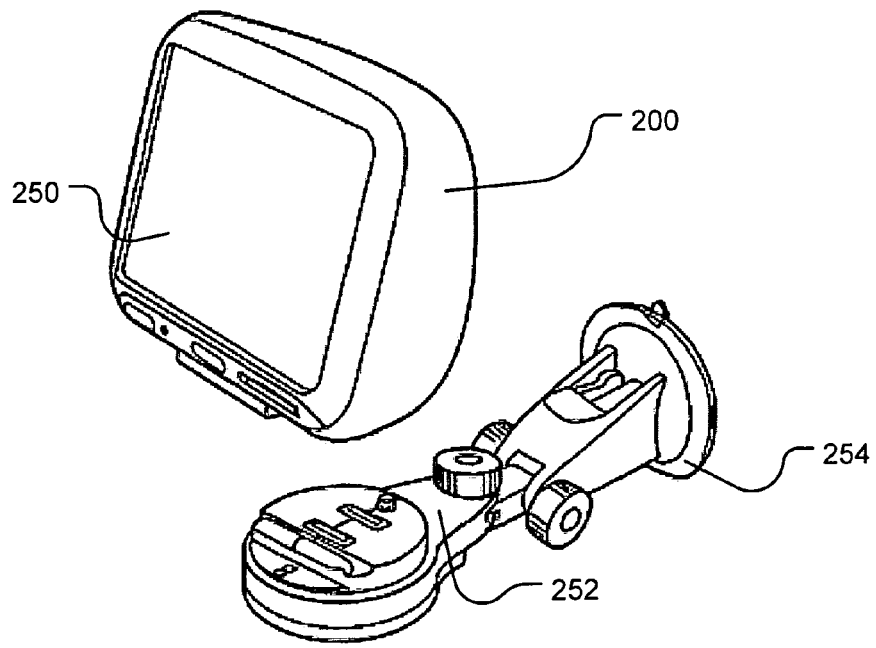
FIG. 4 is a schematic diagram of a docking arrangement for optional use in a vehicle in conjunction with a navigation device of FIG. 2.

Referring to FIG. 4, the navigation device 200 can be a unit that includes the integrated input and display device 206 and the other components of FIG. 2 (including, but not limited to, the internal GPS receiver 224, the microprocessor 202, a power supply (not shown), memory systems 214, etc.).

The navigation device 200 can sit on an arm 252, which itself can be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 can then be rotatable on the arm 252. To release the connection between the navigation device 200 and the docking station, a button (not shown) on the navigation device 200 can be pressed, for example. Other equally suitable arrangements for coupling and decoupling the navigation device 200 to a docking station are well known to persons of ordinary skill in the art.

Figure 5:
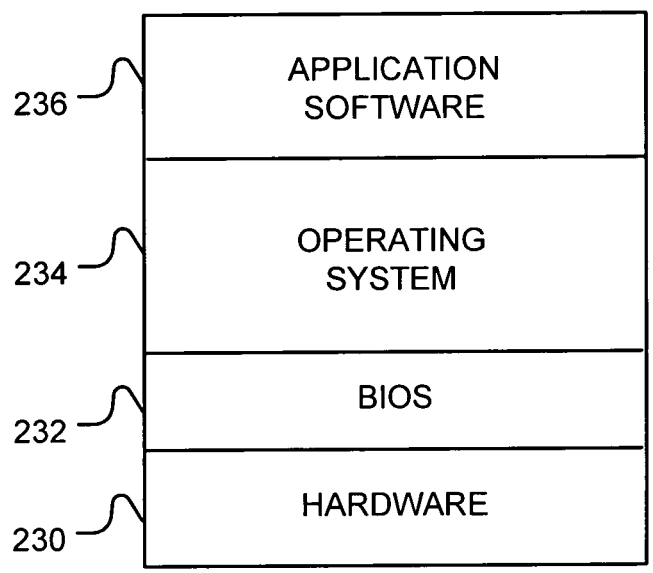
FIG. 5 is a schematic representation of an architectural stack employed by the navigation device of FIG. 3.

Turning to FIG. 5, the processor 202 and memory 214 cooperate to support a BIOS (Basic Input/Output System) 232 that functions as an interface between functional hardware components 230 of the navigation device 200 and the software executed by the device. The processor 202 then loads an operating system 234 from the memory 214, which provides an environment in which application software 236 (implementing some or all of the above described route planning and navigation functionality) can run. The application software 236 provides an operational environment that supports core functions of the navigation device, for example map viewing, route planning, navigation functions and any other functions associated therewith.

Figure 6:
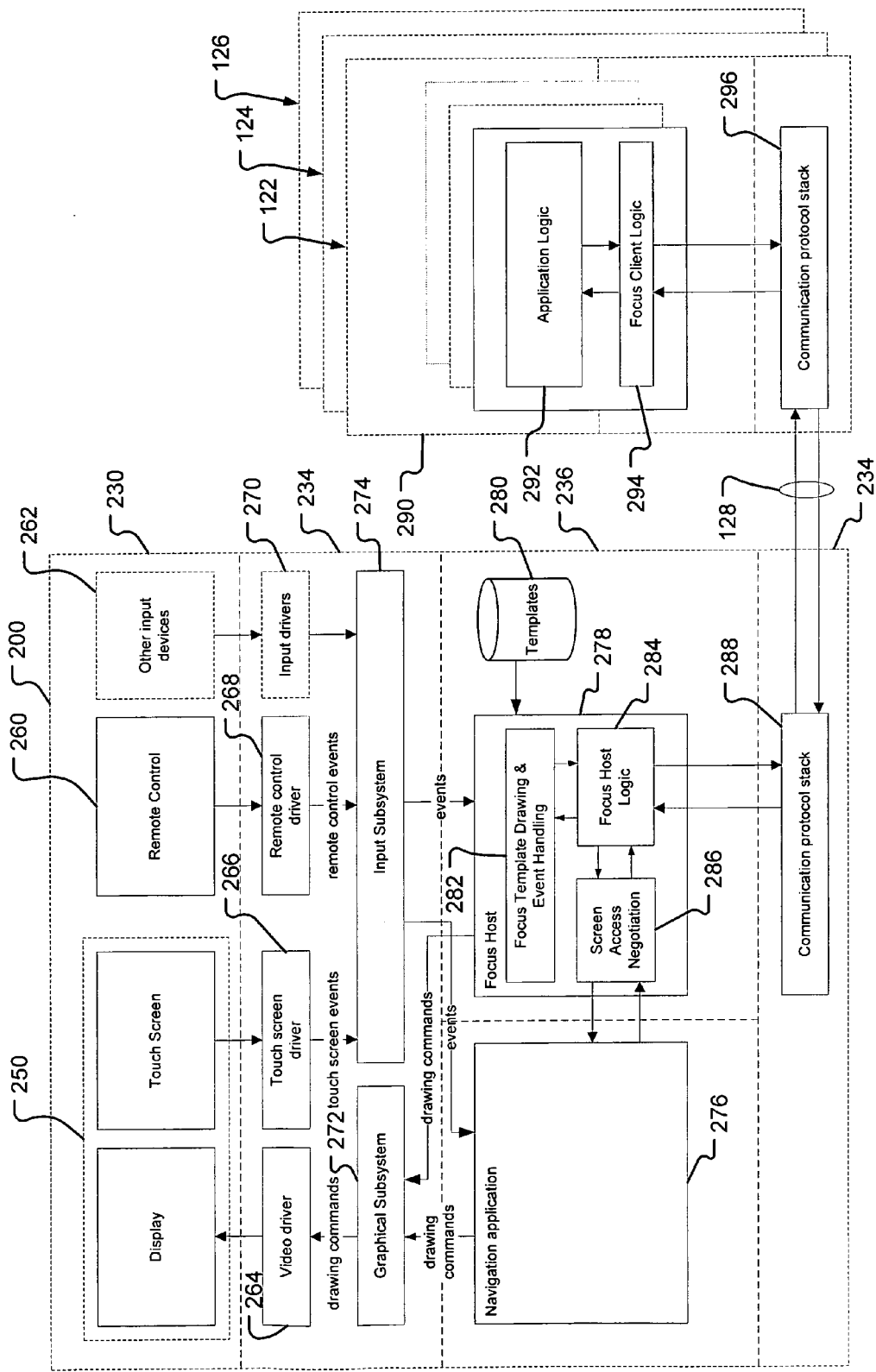
FIG. 6 is a schematic diagram of the communications system of FIG. 2 in greater detail.

Referring to FIG. 6, the combined display and input device, the touchscreen 250, is provided as part of the hardware 230 of the navigation device 200. The hardware 230 also comprises, in this example, a remote control 260. Other input devices 262 can also be provided, for example a voice recognition input unit. One or more of the input devices can be disposed on a steering mechanism of the vehicle, for example a steering wheel or a steering column. As mentioned above, the operating system 234 is supported by the hardware 230 and provides a number of drivers for the hardware 230, for example a video driver 264 for driving a display part of the touchscreen 250, a touchscreen driver 266 for driving a touch sensitive input part of the touchscreen 250, a remote control driver 268 and any other necessary driver 270 for driving any other input device provided.

The video driver 264 is capable of communicating with a graphical subsystem 272 of the operating system 234 that supports the GUI mentioned above. The touchscreen driver 266, the remote control driver 268 and the other driver 270 are capable of communicating with an input subsystem 274 of the operating system 234 that supports processing of input data generated by the input devices 250, 260, 262 in response to input gestures from a user.

As mentioned above, the operating system 234 provides an execution environment that supports the application software 236, the application software 236 including a main application 276, for example a navigation application, the main application 276 being capable of communicating with the graphical subsystem 272 for communicating drawing commands to have images or "screens" rendered and output by the display part of the touchscreen 250. The main application 276 is also capable of communicating with the input subsystem 274 for receiving event data associated with the user input gestures.

The application software 236 also includes a user interface host 278 capable of accessing a database 280 of template data stored in the memory 214. The user interface host 278 comprises a template drawing and event handling module 282 capable of communicating with host processing logic 284, the host processing logic 284 being capable of communicating with a screen access negotiation module 286. The user interface host 278 is capable of communicating with the main application 276 via the screen access negotiation module 286. The user interface host 278 is capable of communicating with the graphical subsystem 272 for communicating drawing commands in order to achieve rendering of screens in accordance with a screen template, details of which will be described later herein. The user interface host 278 is also capable of communicating with the input subsystem 274 in order to receive event data associated with the user input gestures.

The user interface host 278 is additionally capable of communicating with a first communications protocol stack 288 via the host processing logic 284, the first communications protocol stack 288 being supported by the operating system 234. In this example, the first communications protocol stack 288 is a first Bluetooth protocol stack, although the skilled person should appreciate that other protocol stacks can be employed where an alternative communications technology is required. Indeed, other protocol stacks can, in addition to the first Bluetooth protocol stack, be provided in order to support other communications technologies required. Furthermore, transceivers (not shown) to support the Bluetooth stack are suitably provisioned with adequate capacity and configured in order to support a predetermined number of external clients 122, 124, 126 for data communications.

In this example, the first communications link 128 is shown for communicating with the first external device 122. However, the skilled person should appreciate that the Bluetooth protocol stack 288 and associated hardware can, in this example, support communications with the second and third external devices 124, 126 via the second and third communications links 130, 132, respectively.

Turning to the first external device 122, the first external device 122 supports client application software 290. In this respect, the client application software 290 comprises client application logic 292 specific to an operational objective of the first external device 122, for example to control an FM tuner (not shown). The client application logic 292 is capable of communicating with user interface client logic 294, the user interface client logic 294 being capable of communicating with a second communications protocol stack 296, for example a second Bluetooth protocol stack. Via a Radio Frequency (RF) medium, the navigation device 200 is capable of communicating with the first external device 122 using the first and second Bluetooth stacks 288, 296, thereby supporting the first communications link 128. Hence, it can be seen that, in this example, a Personal Area Network (PAN) can be supported for communications between the navigation device 200 and the first external device 122.

Figure 7:
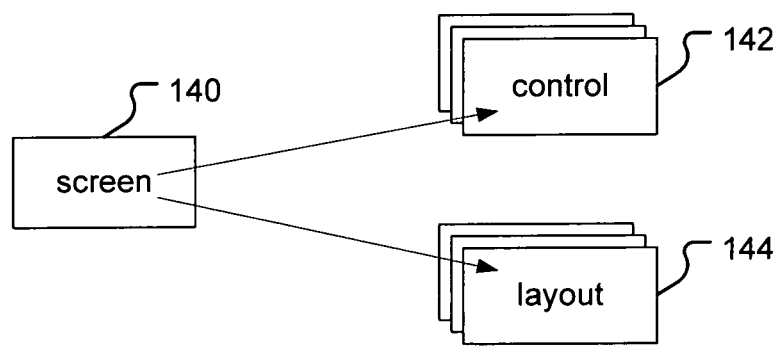
FIG. 7 is a schematic diagram of a data structure used by the navigation device of FIG. 3.

As mentioned above, the database 280 supported by the memory 214 comprises template data, in particular a number of user interface screen templates. In this example, a user interface screen template is structured as follows. Referring to FIG. 7, a user interface template, for example a screen template definition 140, is determined during a design phase of the navigation device 200 and optionally in conjunction with a manufacturer of the first external device 122 and/or the client application logic 292 in order to ensure that one or more "screens" presented by the GUI of the navigation device 200 are suitable for use with the external device 122.

The screen template definition 140 refers to a set of at least one control template definition 142 and at least one layout template definition 144. Where the possibility exists of a screen supporting more than one external application, a screen template definition supporting a so-called "full mode" status of a device and "minimal mode" statuses of devices can be provided. However, in the context of a single device cooperating with the navigation device 200, the screen template definition 140 can comprise XML code as set out, for example, below in Code Fragment I.

---
Code Fragment I
---

```
<?xml version="1.0" ?>
<!-- The screen DTD -->
<!DOCTYPE screen SYSTEM "T_template.dtd" >
<!-- The screen content -->
<screen>
  <template source="template1_interface.xml" type="full" />
  <layout source="template1_layout.xml" alt="0" />
</screen>
```

In this example, the screen template definition refers to a control template definition and a layout template definition. The control template definition 142 is formed from a set of control types that can include buttons, labels, images, progress bars, sliders, check boxes, input fields, radio buttons, list controls and any other suitable control or multi-element control types. The controls listed are, of course, examples of user interface elements, for example user interface widgets, such as GUI widgets. Each control type has a respective set of properties and events associated therewith. In this example, there are two types of properties: "public" properties and "protected" properties. Public properties can be modified at run-time by external or client applications, whereas protected properties are defined by the layout definition that is related to the screen template definition and therefore protected properties are mostly layout related and cannot be modified by the external or client applications. Although not described in this example, parent template definitions and child template definitions can be used, the child template definition being capable of inheriting controls from a parent definition, for example a layout template definition for a child screen template definition does not include details of filled geometric regions, the layout details already being known from a parent screen template. Code Fragment II below provides an example of XML code constituting the control template definition 142.

Code Fragment II

```
<?xml version="1.0" ?>
<!DOCTYPE template SYSTEM "T_interface.dtd" >
<template id="1" >
<!-- LABELS -->
<element class="label" id="1" />
<element class="label" id="2" />
<element class="label" id="3" />
<!-- BUTTONS -->
<element class="button" id="11" />
<element class="button" id="12" />
<element class="button" id="13" />
</template>
```

The layout template definition 144 is used to specify, for example, colour, position and size of each control defined in the control template definition 142. Each control template definition can have multiple layouts, for example two different layouts to cater for different screen orientations, for example landscape and portrait orientations. Code Fragment III below is an example of XML code constituting one layout definition.

Code Fragment III

```
<?xml version="1.0" encoding="UTF-8" ?>
<!DOCTYPE layout SYSTEM "T_layout.dtd" >
<!-- The layout definition -->
<layout>
<!-- Control ID 1 (label 1) -->
<control id="1" client="0" template_id="1">
<property name="top" value="2" />
<property name="left" value="2" />
<property name="width" value="320" />
<property name="height" value="20" />
<property name="level" value="100" />
<property name="text_class" value="ARIAL9FONT" />
<property name="text_halign" value="0" />
<property name="text_color" value="FFFFFF" />
</control>
<!-- Control ID 2 (label 2) -->
<control id="2" client="0" template_id="1">
<property name="top" value="2" />
<property name="left" value="30" />
<property name="width" value="290" />
<property name="height" value="30" />
<property name="level" value="100" />
<property name="text_class" value="ARIAL28FONT" />
```

Code Fragment III
-continued

```
<property name="text_halign" value="0" />
<property name="text_color" value="000000" />
</control>
<!-- Control ID 3 (label 3) -->
<control id="3" client="0" template_id="1">
<property name="top" value="70" />
<property name="left" value="30" />
<property name="width" value="290" />
<property name="height" value="30" />
<property name="level" value="100" />
<property name="text_class" value="ARIAL18FONT" />
<property name="text_halign" value="0" />
<property name="text_color" value="FFFFFF" />
</control>
<!-- Control ID 11 (button 1) -->
<control id="11" client="0" template_id="1">
<property name="top" value="210" />
<property name="left" value="10" />
<property name="width" value="65" />
<property name="height" value="20" />
<property name="level" value="100" />
<property name="text_class" value="ARIAL10FONT" />
<property name="text_halign" value="1" />
<property name="text_color" value="336699" />
<property name="corner_radius" value="0" />
</control>
<!-- Control ID 12 (button 2) -->
<control id="12" client="0" template_id="1">
<property name="top" value="47" />
<property name="left" value="85" />
<property name="width" value="65" />
<property name="height" value="20" />
<property name="level" value="100" />
<property name="text_class" value="ARIAL10FONT" />
<property name="text_halign" value="1" />
<property name="text_color" value="336699" />
<property name="corner_radius" value="0" />
</control>
<!-- Control ID 13 (button 3) -->
<control id="14" client="0" template_id="1">
<property name="top" value="131" />
<property name="left" value="235" />
<property name="width" value="65" />
<property name="height" value="20" />
<property name="level" value="100" />
<property name="text_class" value="ARIAL10FONT" />
<property name="text_halign" value="1" />
<property name="text_color" value="336699" />
<property name="corner_radius" value="0" />
</control>
</layout>
```

By providing, and/or agreeing, one or more screen template definitions with the manufacturer of the first external device 122, it is possible to segregate user interface functionality in the navigation device 200 from device control functionality in the first external device 122 in an effective manner so that knowledge of the functionality of the first external device 122 is not required for development and/or upgrades of the navigation device 200. The same principle applies in relation to the second and third external devices 124, 126.

The above XML sample code relates to a screen output structure 300 (FIG. 8) or template comprising a first area 302, a second area 304 and a third area 306. The first area 302 is capable of accommodating a first label 308 and the second area 304 is capable of accommodating a second label 310 and a third label 312 separated, in this example, by an aesthetic dividing line 314. The third area 306 is capable of accommodating, in this example, three "soft buttons": a pair of soft buttons 316 comprising a first soft button 318 and a second soft button 320, and a third soft button 322.

In operation, the first external device 122 interacts with the navigation device 200 in order to use the GUI of the navigation device 200 to allow a user of the navigation device 200 to control the first external device 122. For the sake of conciseness and simplicity of description, inter-operation of the second or third external devices 124, 126 with the navigation device 200 will not be described initially as analogous operational principles apply. However, inter-operation of two of the three external devices with the navigation device 200 will be described later herein in order to illustrate other useful features provided by the user interface host 278 and/or the user interface client logic 294.

Figure 8:
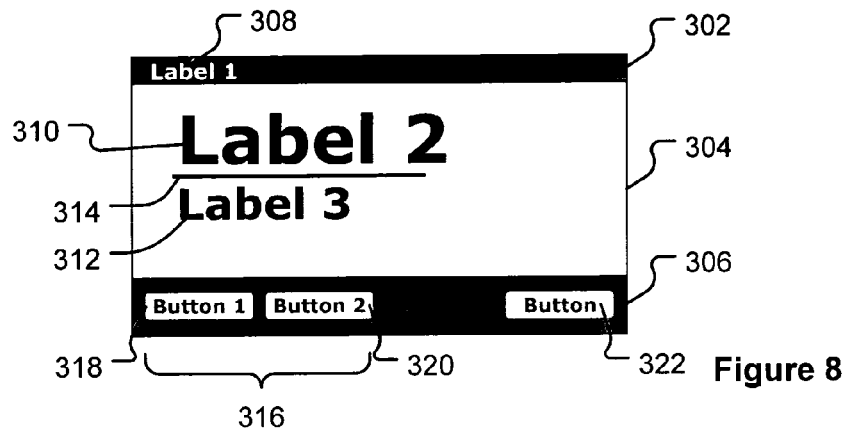
FIG. 8 is a representation of a screen shot associated with an unpopulated template.
Figure 9:
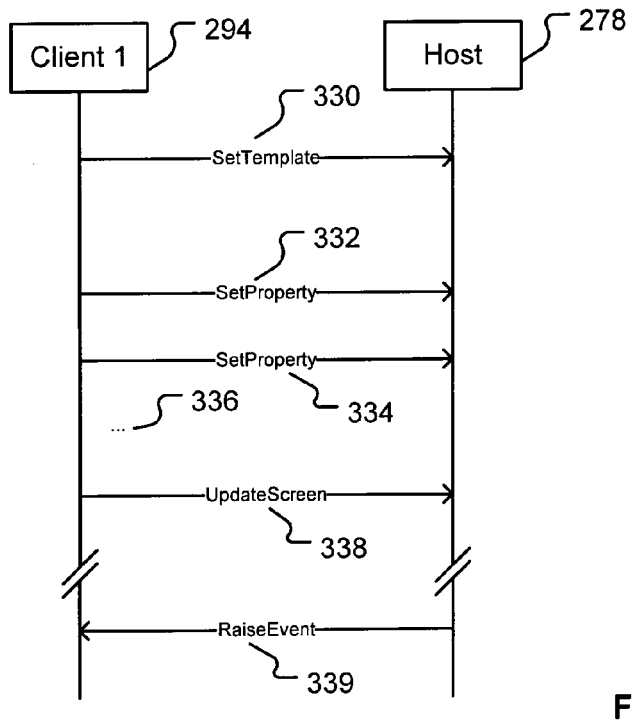
FIG. 9 is a message sequence chart of an interaction between the navigation device of FIG. 3 and an external device.

Turning to FIG. 9, after establishing the first communications link 128 between the first external device 122 and the navigation device 200 in accordance with the Bluetooth communications protocol and a communications session between the user interface host 278, facilitated by the host processing logic 284, and the user interface client logic 294, the user interface client logic 294 sends a SetTemplate message 330 in order to select a predetermined screen template amongst the number of screen templates stored by the user interface host 278, the predetermined template having been selected during a design phase of the first external device 122 to correspond to the template of FIG. 8 described above. Hence, it can be seen that the SetProperty messages serve to qualify one or more widgets set out in the associated widget template definition. Where public properties of a control/widget are not set, the control/widget remains inactive and is not displayed, remaining undetectable to a user. Consequently, only a portion of a screen template can be used by an external device, thereby obviating the need for dedicated templates in some circumstances as parts of existing templates can be used.

Figure 10:
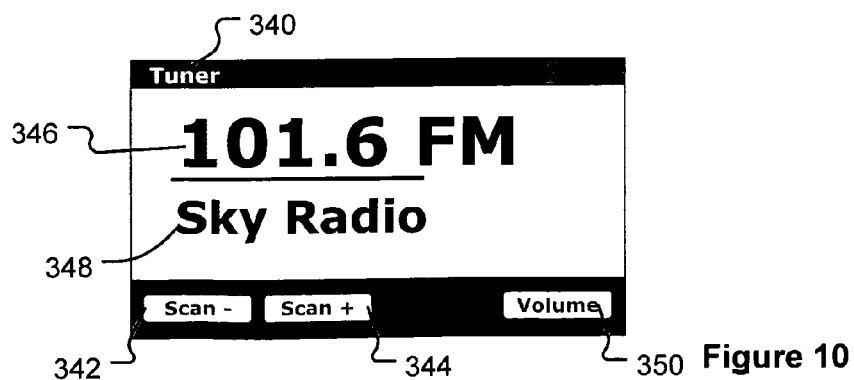
FIG. 10 is a screen shot of a view generated by the navigation device following the sequence of messages of FIG. 8.

Thereafter, the user interface client logic 294 sends a first SetProperty message 332 in order to configure the first label 308 to state the word: "Tuner" 340. The user interface client logic 294 then sends a second SetProperty message 334 in order to configure the pair of soft buttons 316 to state: "Scan –" 342 and "Scan +" 344, respectively. Subsequent SetProperty messages 336 are also sent to configure the second label 310, the third label 312 and the third soft button 322 to state: "101.6 FM" 346, "Sky Radio" 348 and "Volume" 350 respectively. Thereafter, the user interface client logic 294 sends an UpdateScreen message 338. In response to the UpdateScreen message 338, the template drawing and event handling module 282 uses the configuration data received by the host processing logic 284 to generate drawing commands that are communicated to the graphical subsystem 272 of the navigation device 200 for rendering and hence presentation by the display part of the touchscreen 250 in a like manner to that shown in FIG. 10.

By rendering or instantiating the labels and soft buttons, an opportunity is presented to a user to control the first external device 122, which is, as described above, the FM tuner. Consequently, the user interface provided allows the user to provide one or more gestures to control the FM tuner. The gestures can be provided using the touch sensitive input part of the touchscreen 250, for example, or a remote control (not shown). The input subsystem 274 therefore awaits event data from, for example, the touch sensitive input part of the touchscreen.

When, for example, the user touches the "Scan +" (second) button 320, 344, the input subsystem 274 receives touch event data from the touchscreen driver 266, which is then processed and then communicated by the input subsystem 274 as a touch event that is received by the host processing logic 284 and communicated to the user interface client logic 294 via the first communications link 128 as a RaiseEvent message 339 detailing the nature of the event, for example that the button has been pressed. Upon receipt of the RaiseEvent message 339, the user interface client logic 294 interprets the RaiseEvent message, for example identifying a function to which the button has been specified previously to relate and passes an internal control message to the client application logic 292, the client application logic 292 manipulating hardware of the first external device 122 to scan the FM tuner in a forward direction.

Of course, other responses from the user interface client logic 294 can be provided, for example in response to selection by the user of the "volume" (third) button 322, 350. In such an example, the user interface client logic 294 repeats the template selection and response process described above in relation to FIG. 9 in order to request the user interface host 278 to present a new screen in accordance with another user interface screen template, for example a user interface screen template comprising a slider (not shown) to enable the provision of event data communicating a change in volume desired by the user.

As can be seen, requests to use at least part of the user interface of the navigation device 200 are typically handled, in this example, by the user interface host 278 of the navigation device 200 and message passing is employed to enable the user interface client logic 294 of the first external device 122 to exercise a degree of control of content presented by the GUI of the navigation device 200. In this respect, the significance of the information content assigned to each control of a control template by the external device is not known or used by the user interface host 278 and/or the main application 276 or indeed any part of the navigation device 200 when selections are made or commands issued though interactions between the user and the touchscreen 250. The significance of the feedback provided to the applications external to the GUI is similarly of no relevance or use to the GUI. Remote access to the GUI is simply provided to the first external device 122 (and any others eligible to such remote access) and GUI-related information, free of data to control the external device, is simply passed between the user interface of the navigation device 200 and the external device, the GUI-related data including GUI event data. Hence, responses by the user are communicated by the user interface host 278 to the user interface client logic 294 without issuance of any control messages or instructions from the navigation device 200; information is simply relayed between the GUI and the external application.

Figure 11:
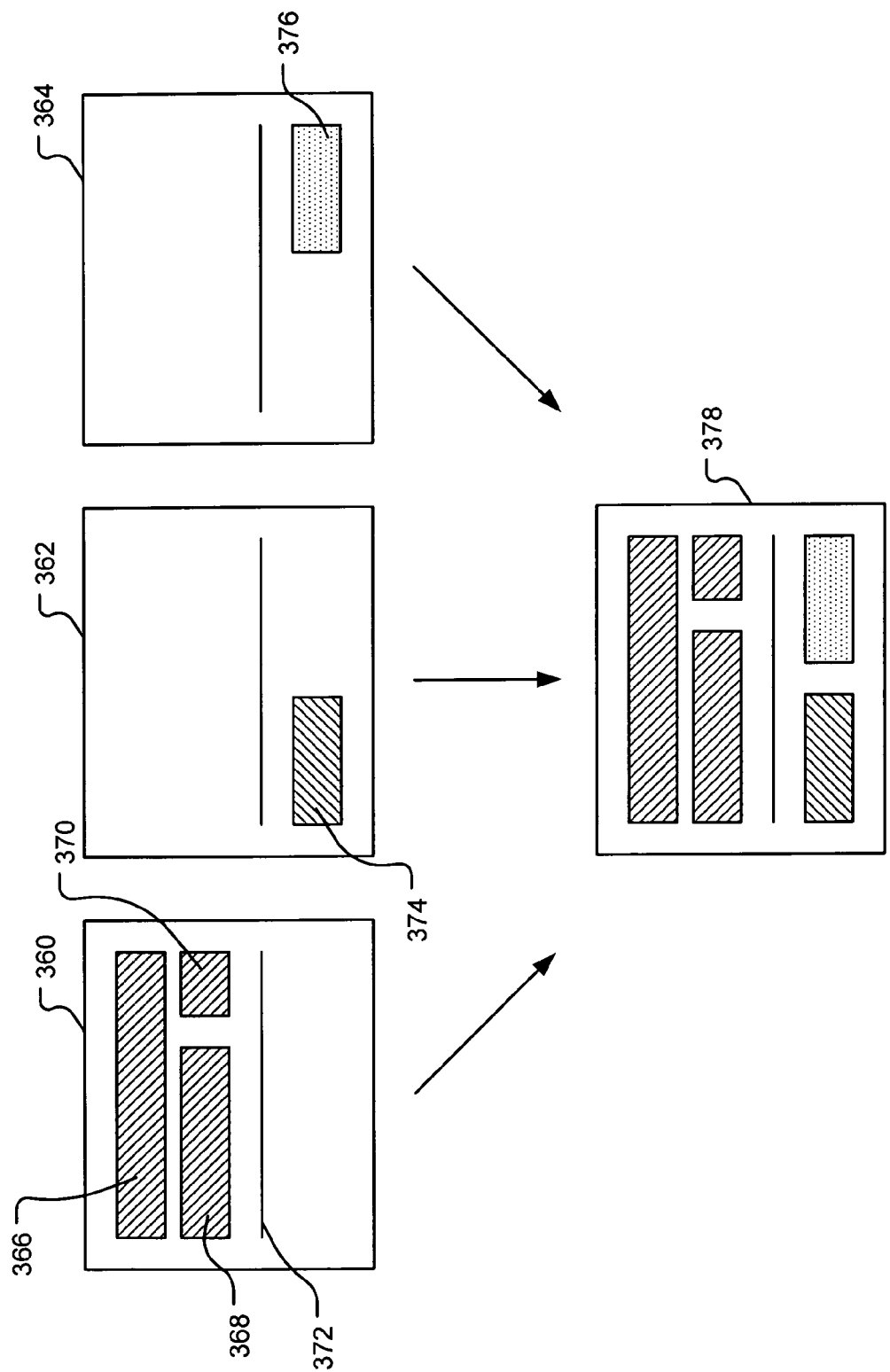
FIG. 11 is a schematic diagram of layer allocation for a "screen" constituting another embodiment of the invention.

Turning to FIG. 11, in another embodiment the second external device 124 is communicating with the navigation device 200 in addition to the first external device 122 and is vying for an opportunity to use the GUI of the navigation device 200. Consequently, and as mentioned above, the screen template definition 140 comprises a number of control template definitions 142 constituting individual "slices" of a screen, each slice being allocated to a different external device. In this respect, operation mode statuses are associated with each slice, namely the full mode status and the minimal mode statuses already mentioned above in relation to the previous embodiment. The full mode status is allocated to one of the main application, the first or second external devices 276, 122, 124 on a priority basis, details of which will be described later herein. However, assuming the main application 276 has indicated a higher priority to the user interface host 278 than the first and second external devices 122, 124, the main application 276 is assigned the full mode status. The main application 276 is therefore permitted to select the template screen to be used by the GUI of the navigation device 200, a first slice 360 having a first control template definition reserved for use by the main application 276. In contrast, the user interface host 278 allocates slices and associated control template definitions of the screen template definition 140 to the first and second external devices 122, 124. The user interface host 278 therefore allocates a second slice 362 and a second control template definition to the second external device 124 and a third slice 364 and a third control template definition to the first external device 122.

Figure 12:
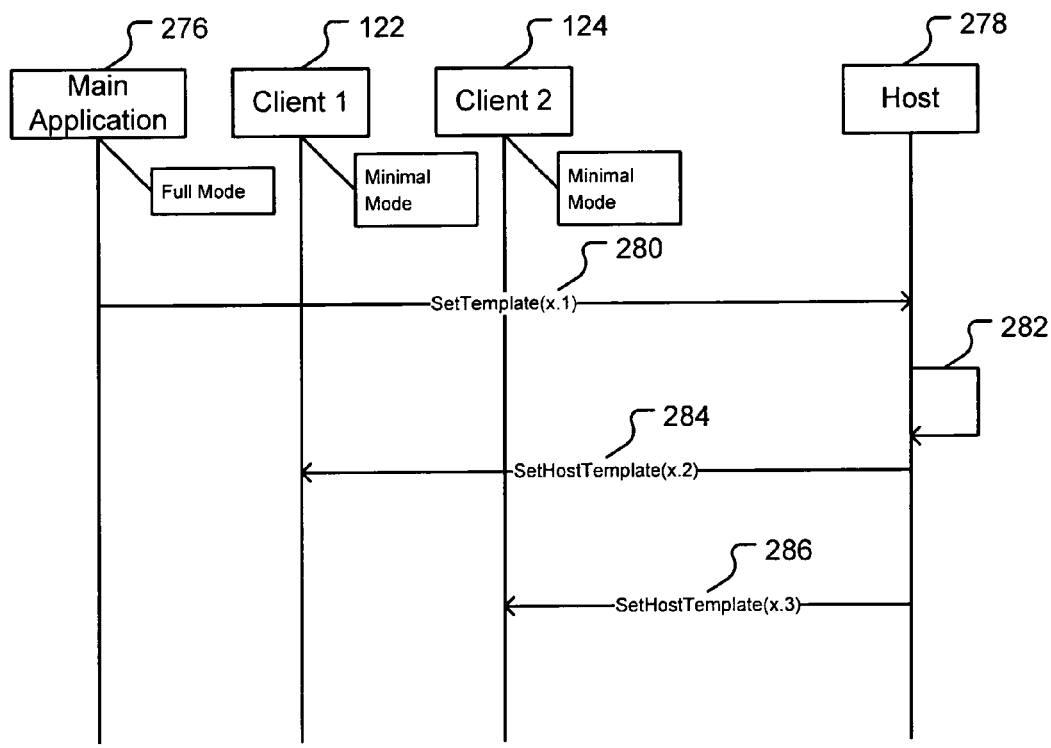
FIG. 12 is a message sequence diagram of another interaction between the navigation device of FIG. 3 and a number of external devices.

To implement the above strategy, the main application 276 communicates (FIG. 12) with the host processing logic 284 via the screen access negotiation module 286 and an internal communications link and sends a SetTemplate message 280 to select the screen template definition 140, the main application 278 being preconfigured to know that the first control template definition and the first slice 360 can be used to interface with the user in respect of navigation functions. Once the screen template definition 140 has been selected by the main application 276, the template drawing and event handling module 282 retrieves 282 the screen template definition 140 and associated first control template and layout definitions from the database 280. Thereafter, the host processing logic 284 sends a first SetHostTemplate message 284 to the user interface client logic 294 of the first external device 122 in order to allocate the third slice 364 and the third control template definition to the first external device 122. Similarly, the host processing logic 284 sends a second SetHostTemplate message 286 to the user interface client logic (not shown) of the second external device 124 in order to allocate the second slice 362 and the second control template definition to the second external device 124.

In this example, the first control template definition for the first slice 360 defines a first slice label 366, a first slice soft button 368 and a second slice soft button 370. A slice aesthetic dividing line 372 is also defined. The second control template definition for the second slice 362 defines a third slice soft button 374. The third control template definition for the third slice 364 defines a fourth slice soft button 376. When consolidated by the GUI of the navigation device 200, a consolidated sliced screen 378 is presented to the user. Of course, as described above, each control template definition has an associated layout definition.

Figure 13:
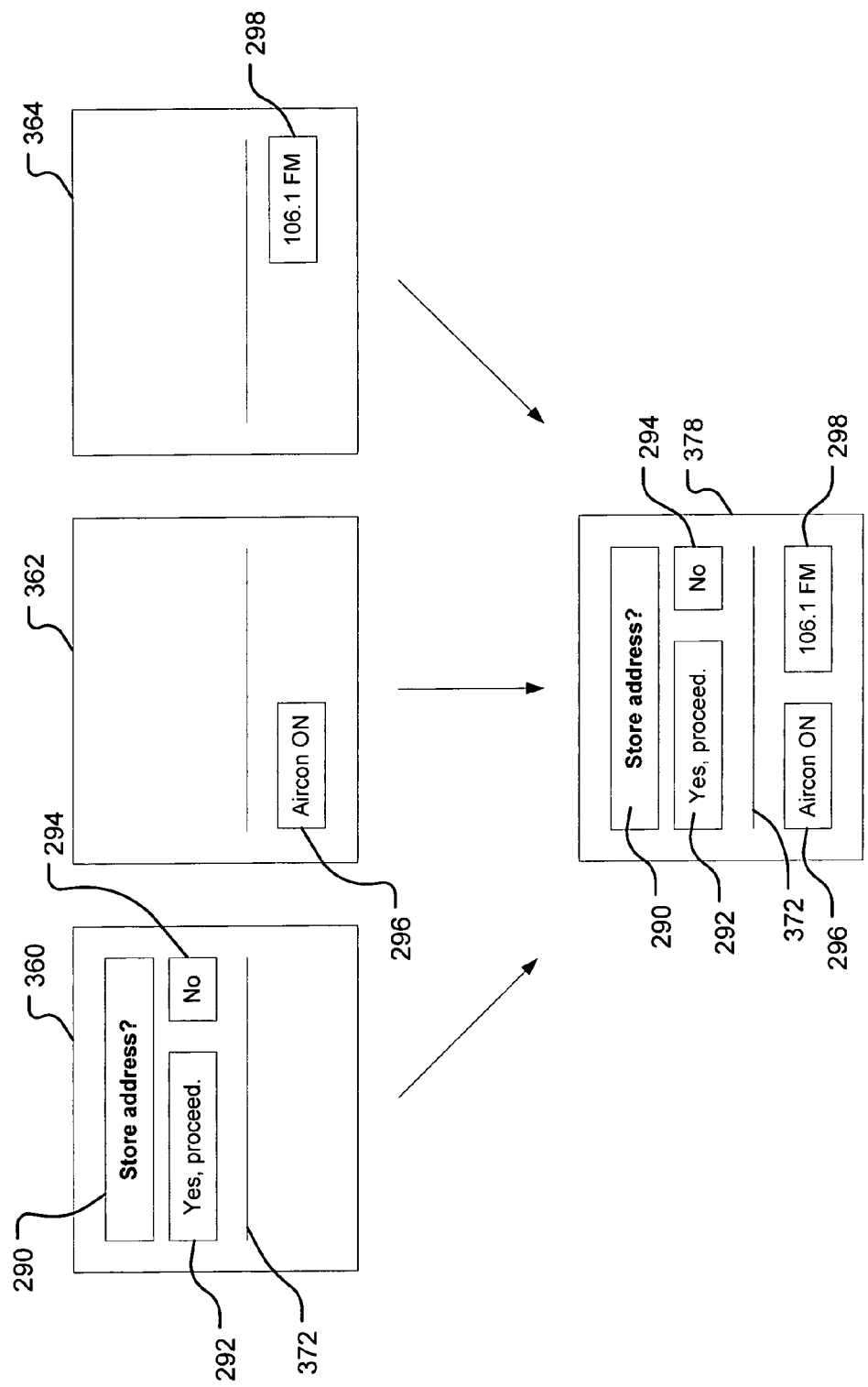
FIG. 13 is a schematic diagram of layers of the "screen" of FIG. 11 as populated following the message sequences of FIGS. 8, 12 and 14.

The first, second and third slices 360, 362, 364 are respectively specified by the main application 276, the first external device 122 and the second external device 124 as follows. In this example, the main application 276 communicates directly with the graphical subsystem 272 in order to render or instantiate the first slice label 366, the first slice soft button 368 and the second slice soft button 370 as: a "Store address?" label 290 (FIG. 13), a "Yes, proceed" soft button 292 and a "No" soft button 294, respectively.

Figure 14:
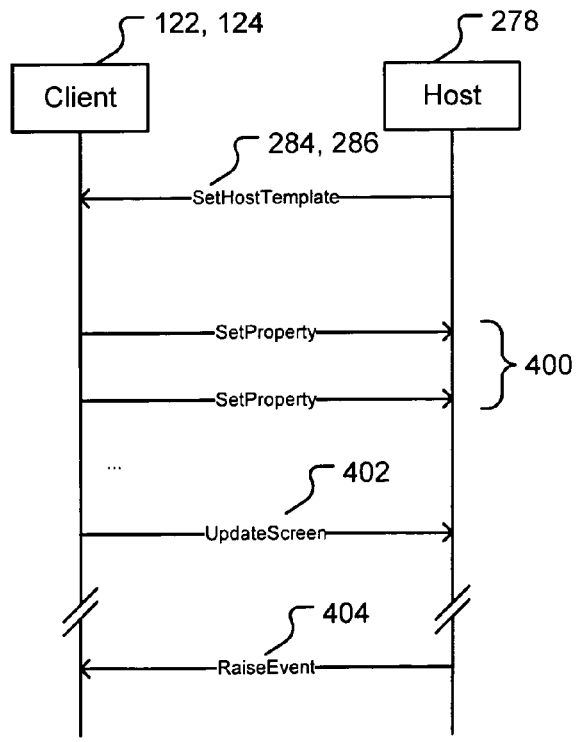
FIG. 14 is a message sequence diagram of a further interaction between the navigation device of FIG. 3 and one of the external devices of FIG. 12 following the sequence of messages of FIG. 12.

In relation to the first and second external devices 122, 124, following allocation of the third and second slices 364, 362 and associated control template definitions, respectively, using the first and second SetHostTemplate messages 284, 286, each of the user interface client logics 294 communicate with the host processing logic 284 of the user interface host 278 by sending one or more SetProperty messages 400 (FIG. 14) in order to specify the third slice soft button 374 and the fourth slice soft button 376 as: an "Aircon ON" soft button 296 associated with air conditioning capability of the second external device 124, and a "106.1 FM" soft button 298 associated with the FM tuner, respectively. After each of the first and second external devices 122, 124 has specified all necessary controls, the second and third external devices 122, 124 each sends a respective UpdateScreen message 402 to the host processing logic 284. In response to each of the UpdateScreen messages 402, the template drawing and event handling module 282 uses the configuration data received by the host processing logic 284 in order to generate drawing commands that are communicated to the graphical subsystem 272 of the navigation device 200 for rendering and hence presentation by the display part of the touchscreen 250 as the consolidate sliced screen 378.

In a like manner to that described above in relation to FIG. 9, selection of the first slice soft button 368, 292 or the second slice soft button 370, 294 results in the generation of event data that is communicated directly by the input subsystem 274 to the navigation application 276 for functional response thereto, if required. In contrast, user selection of the third slice soft button 374, 296 results in generation of event data and generation of another RaiseEvent message 404 by the host processing logic 284 that is sent to the user interface client logic (not shown) of the second external device 124 for interpretation and possible response in the context of the air conditioning functionality of the second external device 124. Similarly, user selection of the fourth slice soft button 376, 298 results in generation of event data and generation of a further RaiseEvent message 404 by the host processing logic 284 that is sent to the user interface client logic 294 of the first external device 122 for interpretation and possible response in the context of the FM tuner functionality of the first external device 122.

Depending upon a selection made by the user in relation to the consolidated sliced screen 378 generated by the GUI of the navigation device 200, the main application 276 can retain the full mode status or full mode status can be transferred to the first external device 122 or the second external device 124. Where the status of the first external device 122 or the second external device 124 is upgraded from the minimal mode to the full mode status, the main application 276 is downgraded to the minimal mode status. Where full mode status is transferred to one of the first or second external devices 122, 124, the external device of upgraded status is permitted to select another screen template, if required and the above allocation and specification of templates is repeated, but with a main focus on the external device of the upgraded status.

In order to request full mode status, one of the first or second external devices 122, 124, for example the first external device 122, sends a RequstFullMode message containing an indication of priority, for example a value of between 0 and 127. The host processing logic 284 is then able to arbitrate between requests made for the full mode status depending upon the priority level value received in each request. Indeed, this technique can be employed to initially set the full mode status of the main application 276 in the example described above.

When a request for full mode status is received by the host processing logic 284 of a higher priority value than that associated with an application currently enjoying the full mode status, the host processing logic 284 communicates loss of the full mode status to the application currently enjoying the full mode status using a LostFullMode message. A FullModeGrant message is also sent to the application of higher priority requesting the full mode status. Of course, if a request for full mode status is of insufficient priority, the host processing logic 284 can send a FullModeRefuse message to the external application making the request for full mode status, resulting in the external application making the request being, at least temporarily, refused the full mode status. However, the host processing logic 284 records the request made by the external application along with the indication of priority accompanying the request. The host processing logic 284 can, however, subsequently assign the full mode status to the external application that has made the request when the application currently enjoying the full mode status either lowers a priority level associated therewith, for example by sending a RequestFullMode message with a lower priority level to the host processing logic 284, or the application currently enjoying the full mode status relinquishes the full mode status by sending a ReleaseFullMode message to the host processing logic 284, thereby setting the priority level associated with the application to 0.

In another example, an application enjoying the full mode status can send a ReleaseFullMode message to the host processing logic 284 relinquishing the full mode status and reducing an associated priority level where the full mode status is no longer required by the application. In such circumstances, the host processing logic 284 sends an AssignFullMode message to another application having a next highest priority value associated therewith, the assignment of the full mode status to the another application resulting in the above-mentioned allocation and specification of templates being repeated.

In another embodiment, in order to facilitate speed of message exchange, a burst mode is provided. In the burst mode, multiple messages or commands are combined into a single message structure in order to reduce round-trip latency. In contrast with non-burst mode where each message has to be acknowledged and replies have to be awaited by the entity sending the message, a single reply, for example an acknowledgement, is sent in reply to the burst mode message. In this example, the burst mode message is unidirectional and sent from the applications to the host processing logic 284.

The above examples therefore illustrate that the personal area network can be used to provide remote access to and/or manipulation of the GUI of the navigation device 200.

Although not mentioned above, the skilled person should appreciate that, inter alia, two additional commands exist: ResetProperties and ResetIndexedProperties. The ResetProperties command causes public properties of a control defined by a control template definition to be reset to default values. If then not subsequently set, the reset control is inactive and, in this example, undetectable to the user. The ResetIndexedProperties command provides a similar reset facility, but for an element of a compound control, for example a list control.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have been described in the context of a GUI, the skilled person should appreciate that the above techniques can be used in conjunction with other user interfaces, for example a voice input and/or audio output user interface.

Additionally or alternatively, although the examples set forth above have been described in the context of a PND that is portable in the sense that the PND is removable from the vehicle and can be physically carried by an individual, the skilled person should appreciate that the PND described above need not be removable from the vehicle and can be integrated into the vehicle, i.e. the PND can be fixed within the vehicle, for example, for permanent location therein.

Indeed, the above examples should be considered as illustrative only and the techniques described above can be implemented in relation to other applications.

For example, the techniques described above need not be applied in relation to the field of navigation and can be used in connection with other fields of endeavour. By way of example, one alternative application comprising a primary device having a user interface that can be shared by other (one or more), external devices, is an in-building system comprising primary devices having respective user interfaces located remotely from devices located elsewhere within the building and hence external to the primary device(s), for example a building environmental control system.

Furthermore, in relation to any of the above-described embodiments it is contemplated that more than one primary device possessing a respective user interface can be provided, the respective user interfaces being capable of being shared by a number of external devices in accordance with any desired permutation of relationships between external devices and one or more primary devices. If desired, an external device can shared user interfaces of a first primary device and a second primary device according to a predetermined scheme, for example where it is necessary to provide a first type of output via a first primary device at a first location and a second type of output via a second primary device at a second location.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A communications apparatus, comprising:
a processing resource arranged to provide a user interface for controlling one or more functions of a main application and at least one external application relative to the main application;
a communications interface arranged to support communication with the at least one external application via a communications network;
a data store comprising a plurality of user interface templates, each user interface template comprising a predetermined expression of a number of user interface elements; and
a user interface host entity arranged to access a user interface template from the data store selectable in response to a received message, and to translate a selected user interface template selected from the predetermined expression of the number of user interface elements into a user interface instantiation;
wherein the user interface host entity is arranged to:
receive messages from the main application and the at least one external application comprising a priority level for the respective application, and permit the application having the higher priority level to select the user interface template that is translated into the user interface instantiation;
receive at least one message from the external application with configuration data specifying information to be rendered for display for at least one user interface element of the selected user interface template;
generate event data in response to a user interaction with the at least one user interface element of the selected user interface template; and
send the generated event data to the external application for interpretation thereby.

2. The apparatus as claimed in claim 1, wherein the user interface host entity is further arranged to deny the selection of the user interface template by the at least one external application or main application if the request from the message from the at least one external application or the main application does not have a higher priority than an application for a current user interface template.

3. The apparatus as claimed in claim 1, wherein the communications interface is arranged to communicate, when in use, with the at least one external application, the at least one external application being located in a device external to the processing resource.

4. The apparatus as claimed in claim 3, further comprising an electronic apparatus comprising the device, the electronic apparatus being housed separately from the processing resource.

5. The apparatus as claimed in claim 1, wherein the user interface template comprises one or more user interface elements including a definable control element.

6. The apparatus as claimed in claim 1, wherein the user interface template comprises one or more user interface elements including a definable label element.

7. The apparatus as claimed in claim 1, further comprising an input device arranged to receive a user interface navigation gesture, the event data corresponding to the user interface navigation gesture.

8. The apparatus as claimed in claim 1, wherein the user interface is a graphical user interface.

9. The apparatus as claimed in claim 1, wherein the user interface template has a layout associated therewith.

10. The apparatus as claimed in claim 1, wherein the communications interface is a wireless communications interface.

11. A navigation apparatus comprising the communications apparatus as claimed in claim 1.

12. A communications system comprising:
a first device comprising the communications apparatus as claimed in claim 1; and
a second device supporting the external application, wherein the first and second devices are arranged to communicate via the communications network.

13. The system as claimed in claim 12, wherein the first device has a first operational task associated therewith and the second device has a second operational task associated therewith, the first and second operational tasks being different.

14. The system as claimed in claim 12, wherein the first device is a navigation device and the second device is an entertainment system.

15. A method of providing a user interface for controlling one or more functions of a main application and at least one external application relative to the main application, the method comprising:
receiving messages from the main application and the at least one external application comprising a priority level for the respective application;
permitting the application having the higher priority level to select the user interface template from a plurality of user interface templates, each user interface template comprising a predetermined expression of a number of user interface elements;
receiving at least one message from the external application with configuration data specifying information to be rendered for display for at least one user interface element of the selected user interface template;
translating the selected user interface template from the predetermined expression of the number of user interface elements and the received configuration data into a user interface instantiation for a user;
generating event data in response to a user interaction with the at least one user interface element of the selected user interface template; and
sending the generated event data to the external application for interpretation thereby.

16. The method as claimed in claim 15, comprising denying the selection of the user interface template by the at least one external application or main application if the request from the message from the at least one external application or the main application does not have a higher priority than an application for a current user interface template.

17. A non-transitory computer-readable medium which stores a set of instructions which when executed performs a method of providing a user interface for controlling one or more functions of a main application and at least one external application relative to the main application, the method executed by the set of instructions comprising:
receiving messages from the main application and the at least one external application comprising a priority level for the respective application;
permitting the application having the higher priority level to select the user interface template from a plurality of user interface templates, each user interface template comprising a predetermined expression of a number of user interface elements;
receiving at least one message from the external application with configuration data specifying information to be rendered for display for at least one user interface element of the selected user interface template;

translating the selected user interface template from the predetermined expression of the number of user interface elements and the received configuration data into a user interface instantiation for a user;

generating event data in response to a user interaction with the at least one user interface element of the selected user interface template; and sending the generated event data to the external application for interpretation thereby.

18. The computer-readable medium as claimed in claim 17, comprising denying the selection of the user interface template by the at least one external application or main application if the request from the message from the at least one external application or the main application does not have a higher priority than an application for a current user interface template.

* * * * *